United States Patent
Kim

(10) Patent No.: US 7,406,342 B2
(45) Date of Patent: Jul. 29, 2008

(54) APPARATUS AND METHOD FOR REDUCING ELECTRIC POWER CONSUMPTION IN MOBILE COMMUNICATION TERMINAL

(75) Inventor: Ki-Soo Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 400 days.

(21) Appl. No.: 11/311,389

(22) Filed: Dec. 19, 2005

(65) Prior Publication Data

US 2006/0148469 A1   Jul. 6, 2006

(30) Foreign Application Priority Data

Jan. 4, 2005   (KR) .................. 10-2005-0000579

(51) Int. Cl.
*H04M 1/38* (2006.01)
(52) U.S. Cl. .............. 455/574; 455/572; 455/458; 370/311; 370/252
(58) Field of Classification Search ............ 455/574, 455/572, 458; 370/311, 328
See application file for complete search history.

(56) References Cited

U.S. PATENT DOCUMENTS

| 6,215,980 | B1 * | 4/2001 | Kim | 455/91 |
| 7,020,102 | B2 * | 3/2006 | Tuomainen et al. | 370/311 |
| 2003/0032457 | A1 * | 2/2003 | Leung | 455/567 |
| 2003/0105983 | A1 * | 6/2003 | Brakmo et al. | 713/320 |
| 2003/0117968 | A1 * | 6/2003 | Motegi et al. | 370/311 |
| 2004/0160942 | A1 * | 8/2004 | Kelley et al. | 370/350 |
| 2005/0002370 | A1 * | 1/2005 | An et al. | 370/345 |
| 2005/0170801 | A1 * | 8/2005 | Deolalikar et al. | 455/226.1 |
| 2005/0215274 | A1 * | 9/2005 | Matson et al. | 455/522 |

* cited by examiner

*Primary Examiner*—Danh C Le
(74) *Attorney, Agent, or Firm*—The Farrell Law Firm, PC

(57) ABSTRACT

An apparatus and a method for reducing power consumption in a mobile communication terminal are disclosed. According to the apparatus and the method, when a mobile communication terminal receives a paging channel in a sleep mode, an expiration time of a predetermined timer is retroacted (advanced) or delayed to a reception time of the paging channel within a range in which operations of the mobile communication terminal are not decisively influenced, so that the total number of times of activation of the mobile communication terminal can be reduced. Consequently, power consumption can be reduced.

6 Claims, 3 Drawing Sheets

APPARATUS AND METHOD FOR REDUCING ELECTRIC POWER CONSUMPTION IN MOBILE COMMUNICATION TERMINAL

PRIORITY

This application claims priority to an application entitled "Apparatus and Method for Reducing Electric Power Consumption in Mobile Communication Terminal" filed in the Korean Intellectual Property Office on Jan. 4, 2005 and assigned Serial No. 2005-579, the contents of which are incorporated herein by reference.

BACKGROUND OF THE INVENTION

1. Field of the Invention

The present invention relates to a mobile communication terminal, and more particularly to an apparatus and a method for reducing power consumption in a mobile communication terminal.

2. Description of the Related Art

Generally, a mobile communication terminal sets a sleep mode in order to save power in a waiting state. Further, a mobile communication terminal is activated again when a paging period and an operating system timer expire. The operating system timer denotes various timers provided for operation of a mobile communication terminal. For example, the operating system timer may include a protocol timer, a Man Machine Interface (MMI) timer, an application timer, etc. That is, when a mobile communication terminal is set to receive a paging channel transmitted from a network, the mobile communication terminal must end the sleep mode at a reception point of the paging channel. Further, the mobile communication terminal must end the sleep mode when the various timers of the mobile communication terminal expire. This is also applied when an end point of the sleep mode and a waking point by expiration of the operating system timer are within several tens of ms for reception of the paging channel. In other words, the mobile communication terminal is activated when the timer expires even within several tens of ms. Therefore, power consumption occurs during activation of the mobile communication terminal in each case.

The reception of the paging channel is an operation which must necessarily be performed by the mobile communication terminal at the corresponding point in order to receive system information, but an error of about several tens of ms can occur depending on the type of the system operating timer. However, most timers do not cause fatal defects in the operation of the mobile communication terminal. For example, even though time information displayed on a display screen of the mobile communication terminal has an error of about several tens of ms, a user cannot notice the difference. Accordingly, if a difference of several tens of ms is properly corrected, it is possible to reduce the frequency of terminating a sleep mode and thus reduce power consumption.

SUMMARY OF THE INVENTION

Accordingly, the present invention has been made to solve the above-mentioned problems occurring in the prior art, and it is an object of the present invention to provide a method and an apparatus for reducing power consumption in a mobile communication terminal.

In order to accomplish the aforementioned object, according to one aspect of the present invention, there is provided a method for reducing power consumption in a mobile communication terminal, the method including determining a reception time of a paging channel and an expiration time of a predetermined timer in a sleep mode; temporarily replacing the expiration time of the timer with the reception time of the paging channel when a time interval by a time difference between the reception time of the paging channel and the expiration time of the timer is within a preset valid time interval; and ending the sleep mode, receiving a paging channel, and performing an operation relating to the predetermined timer when a current time becomes the reception time of the paging channel.

In order to accomplish the aforementioned object, according to another aspect of the present invention, there is provided an apparatus for reducing power consumption in a mobile communication terminal, the apparatus including a memory for storing an allowable error range for an expiration time of a predetermined timer as a valid time interval; and a controller for determining a reception time of a paging channel and an expiration time of a predetermined timer in a sleep mode, temporarily replacing the expiration time of the timer with the reception time of the paging channel when a time interval by a time difference between the reception time of the paging channel and the expiration time of the timer is within a preset valid time interval, ending the sleep mode, receiving a paging channel, and performing an operation relating to the predetermined timer when a current time becomes the reception time of the paging channel.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings.

Figure 1:
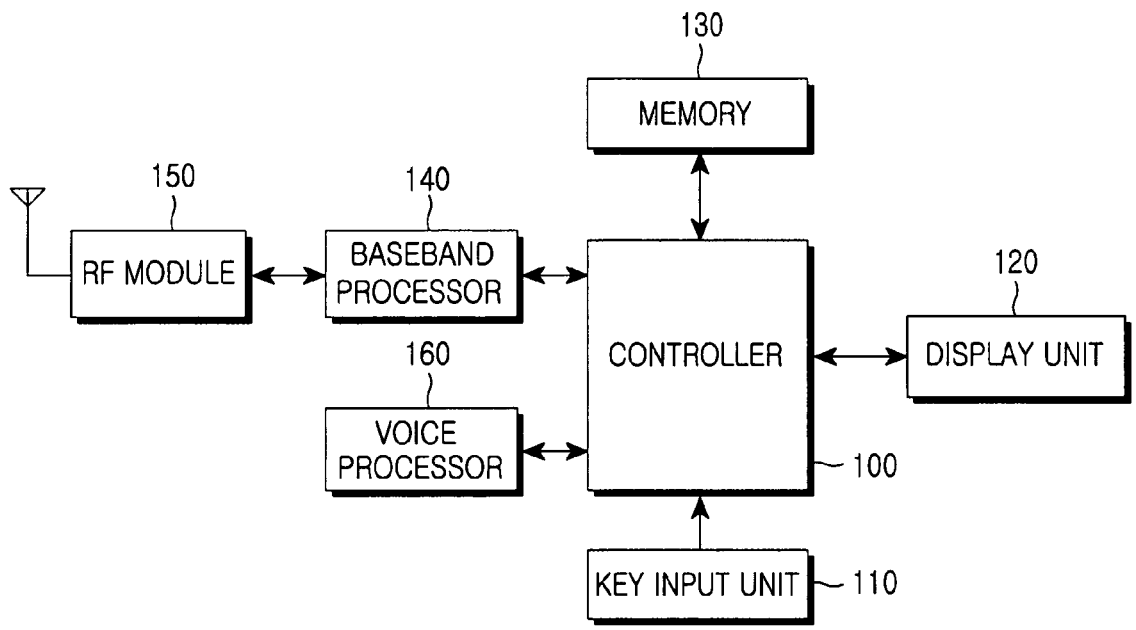
FIG. 1 is a block diagram of a mobile communication terminal to which the present invention is applied.

FIG. 1 is a block diagram of a mobile communication terminal to which the present invention is applied. Referring to FIG. 1, the mobile communication terminal includes a controller 100, a key input unit 110, a display unit 120, a memory 130, a baseband processor 140, a Radio Frequency (RF) module 150, and a voice processor 160.

The key input unit 110 includes number keys 0~9, a * key, a # key, various function keys, such as menu keys, selection keys, communication keys, deletion keys, power/end keys, and volume keys, corresponding to various functions provided in the mobile communication terminal. Further, the key input unit 110 provides the controller 100 with key input data corresponding to keys pressed by a user. A voice processor 160 connected to the controller 100, and a microphone and a speaker connected to the voice processor 160 are used for telephone communication and voice recording.

The RF module 150 transmits/receives radio signals with a mobile communication base station through an antenna, and modulates signals input from the controller 100 through the baseband processor 140 into RF signals, and transmits the RF signals through the antenna. The RF module 150 demodulates RF signals received through the antenna and provides the demodulated signals to the controller 100 through the baseband processor 140. Further, the RF module 150 receives a paging channel and provides system information to the controller 100. The baseband processor 140 processes baseband signals transmitted/received between the RF module 150 and the controller 100.

The controller 100 processes and controls the general functions of the mobile communication terminal such as telephone communication and data communication. Further, the controller 100 includes a plurality of operating system timers for the operations of the mobile communication terminal, operates a proper timer as the situation requires, and performs a corresponding operation when the timer expires. The operating system timers may include a protocol timer, a Man Machine Interface (MMI) timer, an application timer, etc. According to one operation of the mobile communication terminal performed by the operation of the MMI timer, time information is displayed on the display screen of the display unit 120. According to the operation of the mobile communication terminal performed by the operation of the application timer, an alarm is set by a user, etc. Further, various operations defined for mobile communication are performed by the operation of the protocol timer.

The memory 130 stores a program for processing and control of the controller 100, reference data, various renewable data for storing, etc., which functions as a working memory of the controller 100. Further, the memory 130 stores valid time interval data according to the present invention. The valid time interval represents a random time interval within a range in which the basic operation of the mobile communication terminal is not influenced even though an expiration time of the operating system timer occurring before or after a reception time of a paging channel is retroacted (advanced) or delayed to the reception time of the paging channel. That is, the valid time interval represents a time interval within an allowable error range of an expiration time for a predetermined timer. The valid time interval is determined as a multiple of Ostick (a time interval used in Global System for Mobile communications) with a maximum time interval of about 40 ms according to an embodiment of the present invention. The Ostick has a basic unit of 4.615 ms which is a Time Division Multiple Access (TDMA) frame, which is generally indicated as two or four multiples of the TDMA frame, and about. 9.2 or 18.4 ms. The valid time interval may also be fixedly set or set by a user's selection according to an embodiment of the present invention. The valid time interval may have different maximum lengths according to an embodiment of the present invention.

When the mobile communication terminal having the afore-described construction receives the paging channel in a sleep mode, the expiration time of a predetermined timer is retroacted (advanced) or delayed to the reception time of the paging channel within a range in which the operation of the mobile communication terminal is not decisively influenced, so that the total number of times of activation of the mobile communication terminal is reduced. Further, a corresponding timer is reset based on the original expiration time regardless of the retroacted or delayed expiration time, so that an operation period of the predetermined timer is not influenced. In the present invention, the reason for employing the reception time of the paging channel as a standard activation time of the mobile communication terminal is because a fatal error may occur in performing communication if system information included in the paging channel is not received due to non-reception of the paging channel on time. In the meantime, timers operating in the mobile communication terminal have an allowable error range of about several tens of ms.

When a sleep mode is set, the controller 100 determines the reception time of the first paging channel and an expiration time of the first terminating timer with respect to the current time, according to the present invention. The first timer may include a protocol timer, an MMI timer, an application timer, etc., according to an embodiment of the present invention. Further, when the expiration time of the first timer is within the preset valid time interval with respect to the reception time of the paging channel, the controller 100 replaces the expiration time with the reception time of the paging channel and terminates the first timer at the reception time of the paging channel. Then, the controller 100 resets the first timer with respect to the original time before the expiration time of the first timer is replaced with the reception time of the paging channel, thereby preventing any abnormalities from occurring in an operation period. Accordingly, the mobile communication terminal is activated only at the reception time of the paging channel, so that the amount of consumed power can be reduced.

In the operation process as described above, the first timer actually operates with an error of about several tens of ms. However, because an MMI timer or an application timer is a timer for performing operations for increasing the user's convenience, the error of about several tens of ms does not have great influence on performance of a smooth operation and is in a range which a user cannot perceive. For example, in the time information displayed on the display screen of the mobile communication terminal, minute information is provided to a user by displaying numbers in sequence each minute. Further, when a timer relating to the minute information expires according to the reception time of the paging channel according to the present invention, the mobile communication terminal displays the numbers in sequence earlier or later than an actual time by several tens of ms, but the user cannot perceive it. Further, because the protocol timer determines a length of the valid time interval within a range, in which an abnormal operation does not occur, in performing a protocol-related operation, the protocol timer does not have a decisive influence on the operation of the mobile communication terminal.

Figure 2:
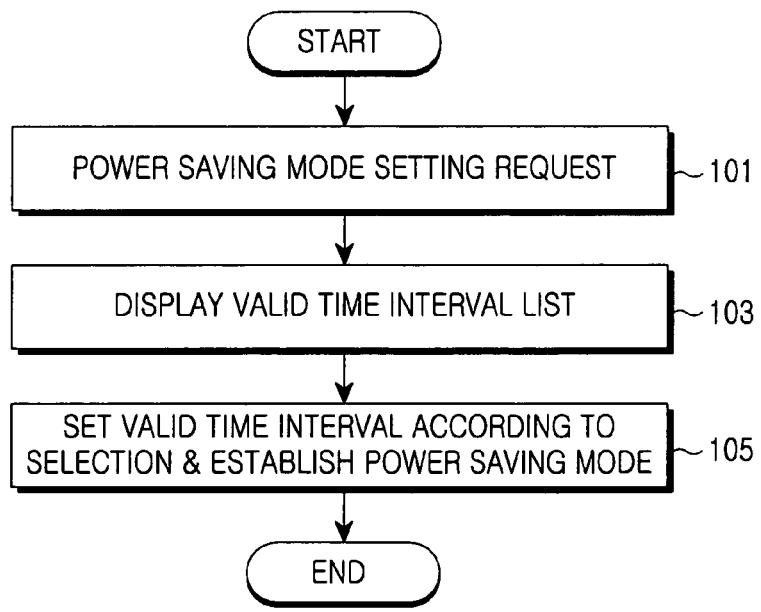
FIG. 2 is a flow diagram illustrating the operation of a controller based on a setting process of a power saving mode according to one embodiment of the present invention.

Hereinafter, an operation process of the controller 100 according to the present invention will be described with reference to FIGS. 2 to 4. First, a process for setting the valid time interval according to one embodiment of the present invention will be described with reference to FIG. 2. In one embodiment of the present invention, a power saving mode is established by setting the valid time interval according to a user's selection. Further, the mobile communication terminal stores a plurality of valid time intervals expressed by a multiple of Ostick. FIG. 2 is a flow diagram illustrating the operation of the controller 100 based on a setting process of the power saving mode according to one embodiment of the present invention. In step 101, when a power saving mode setting request is received from a user, step 103 is performed. In step 103, the controller 100 displays a valid time interval list, and then step 105 is performed. The valid time interval list represents a list for the valid time intervals stored in advance. The user selects one from the valid time interval list. In step 105, the controller 100 sets a valid time interval according to the user's selection, establishes a power saving mode, and ends the operation process.

Hereinafter, an operation process for saving power in a waiting state of the mobile communication terminal for which the power saving mode has been set by the process as described above will be described with reference to FIG. 3. FIG. 3 is a flow diagram illustrating the operation of the controller 100 under the power saving mode according to one embodiment of the present invention.

Figure 3:
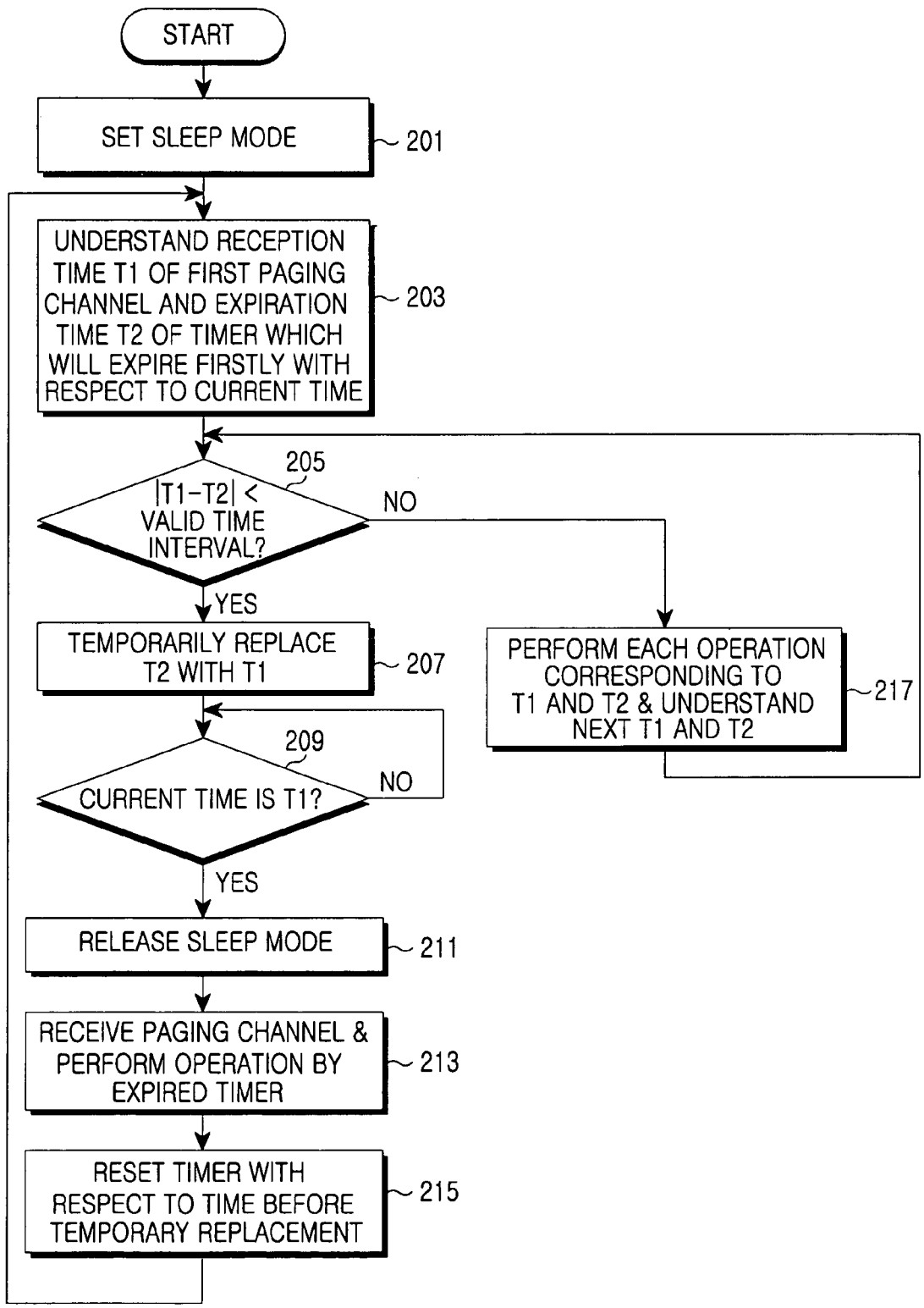
FIG. 3 is a flow diagram illustrating the operation of a controller during the power saving mode according to one embodiment of the present invention.

As illustrated in FIG. 3, when a sleep mode is set in step 201, step 203 is performed. In step 203, the controller 100 determines the reception time T1 of the first paging channel and an expiration time T2 of a predetermined timer which will expire first with respect to the current time. Then, step 205 is performed. In general, a GSM mobile communication terminal receives the paging channel with a time cycle of 2 to 9 multi-frames. The multi-frame includes 51 TDMA frames. Further, the exact reception time of the paging channel is included in information of the already received paging channel. In step 205, the controller 100 determines if a difference between the reception time TI of the paging channel and the expiration time T2 of the timer is within a predetermined valid time interval. As a result of the determination, when the difference between T1 and T2 is within the valid time interval, step 207 is performed. However, when the difference between T1 and T2 is greater than the valid time interval, step 217 is performed.

Figure 4:
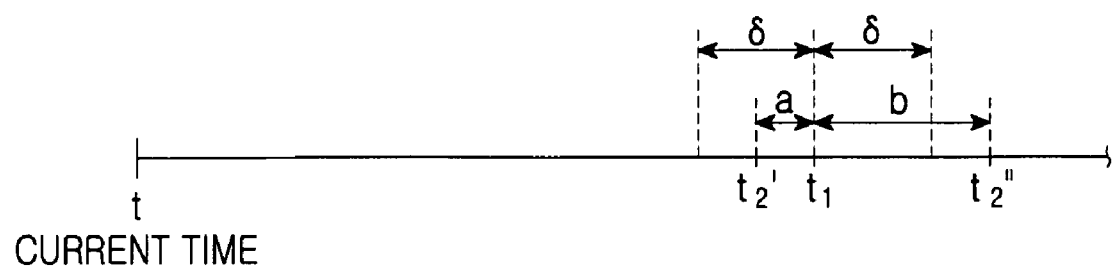
FIG. 4 is a timing chart according to one embodiment of the present invention.

For example, as illustrated in FIG. 4, the controller 100 determines a reception time t1 of a first paging channel and an expiration time t2' of a first timer with respect to the current time t. FIG. 4 is a timing chart according to one embodiment of the present invention. In FIG. 4, t2' is an expiration time point of the timer which expires first with respect to the current time, and a time interval "a" between the reception time t1 of the paging channel and the expiration time t2' of the timer is within the valid time interval δ. In this case, the controller 100 performs steps 207, 209, 211 and 213 of FIG. 3, temporarily replaces t2' with t1, performs an operation based on the reception of the paging channel at t1 and the expiration of the timer.

In step 207, the controller 100 temporarily replaces the expiration time T2 of the timer with the reception time T1 of the paging channel. In step 209, the controller 100 determines if the current time is the reception time T1 of the paging channel. When the current time is the reception time T1 of the paging channel, step 211 is performed. In step 211, the controller 100 releases the sleep mode and activates the mobile communication terminal. In step 213, the controller 100 receives a paging channel and performs an operation by the expired timer. In step 215, the controller 100 resets the expired timer with respect to a time before the temporary replacement. Then, steps 203, 205, 207, 209, 211, 213, 215 and 217 are repeated.

As a result of the determination in step 205, when the difference between the reception time Ti of the paging channel and the expiration time T2 of the timer is not within the valid time interval, the controller 100 performs each operation according to a time sequence. For example, as illustrated in FIG. 4, when the expiration time T2 of the timer which will expire is t2", a time interval "b" between the reception time t1 of the paging channel and the expiration time t2" of the timer is not within the valid time interval δ. Accordingly, the controller 100 activates the mobile communication terminal at t1 and receives a paging channel. Then, the controller 100 activates the mobile communication terminal again at t2" and performs an operation based on an expiration of the timer. In step 217, the controller 100 performs each operation corresponding to the reception time T1 of the paging channel and the expiration time T2 of the timer, and determines T1 and T2 in the next order. Then, steps 205 and 207 are repeated.

According to the present invention as described above, when a mobile communication terminal receives a paging channel in a sleep mode, an expiration time of a predetermined timer is retroacted (advanced) or delayed to a reception time of the paging channel within a range in which operations of the mobile communication terminal are not decisively influenced, so that the total number of times of activation of the mobile communication terminal can be reduced. Consequently, power consumption can be reduced.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for reducing power consumption in a mobile communication terminal, the method comprising:
    determining a reception time of a paging channel and an expiration time of a predetermined timer in a sleep mode;
    temporarily replacing the expiration time of the timer with the reception time of the paging channel when a time interval by a time difference between the reception time of the paging channel and the expiration time of the timer is within a preset valid time interval; and
    ending the sleep mode, receiving a paging channel, and performing an operation relating to the predetermined timer when a current time becomes the reception time of the paging channel.

2. The method as claimed in claim 1, wherein the valid time interval includes an allowable error range for the expiration time of the predetermined timer.

3. The method as claimed in claim 1, further comprising resetting the predetermined timer with respect to a time before the temporary replacement.

4. The method as claimed in claim 1, wherein the valid time interval is set based on a user's selection.

5. The method as claimed in claim 1, wherein the controller resets the predetermined timer with respect to a time before the temporary replacement.

6. An apparatus for reducing power consumption in a mobile communication terminal, the apparatus comprising:
    a memory for storing an allowable error range for an expiration time of a predetermined timer as a valid time interval; and
    a controller for determining a reception time of a paging channel and an expiration time of a predetermined timer in a sleep mode, temporarily replacing the expiration time of the timer with the reception time of the paging channel when a time interval by a time difference between the reception time of the paging channel and the expiration time of the timer is within a preset valid time interval, ending the sleep mode, receiving the paging channel, and performing an operation relating to the predetermined timer when a current time becomes the reception time of the paging channel.

* * * * *